No. 884,095.                                                           PATENTED APR. 7, 1908.
C. W. KRONENBERG & H. STRANZENBACH.
INSECT CATCHER.
APPLICATION FILED JUNE 21, 1906.
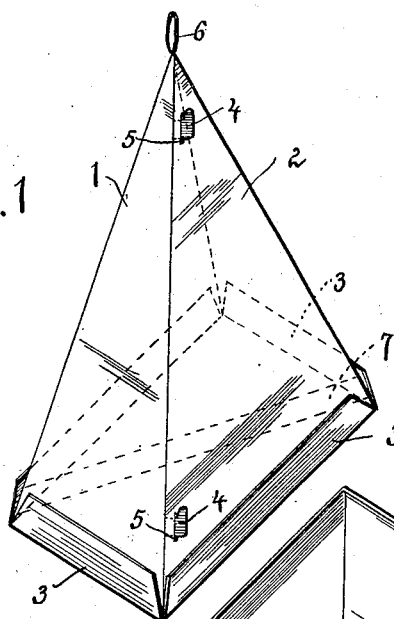
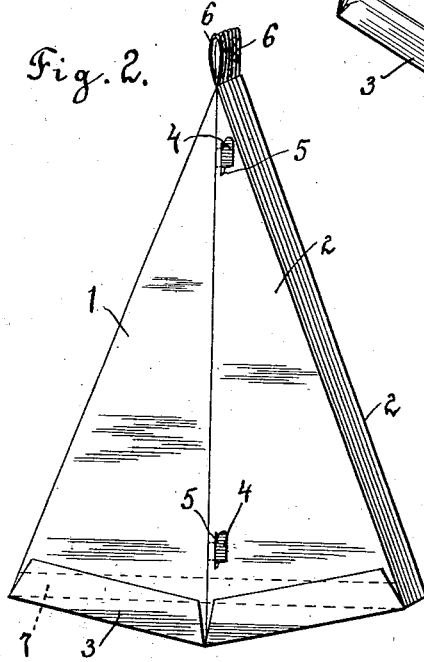
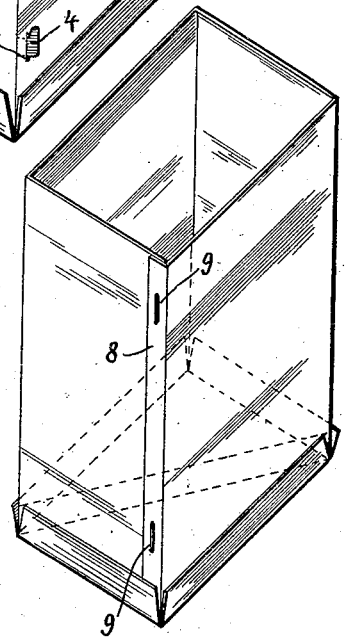
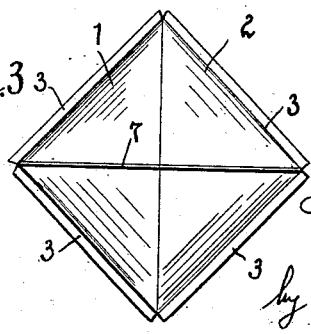
WITNESSES
Albert Hernag.
Rudolf Sachers
Charles W. Kronenberg
Hermann Stranzenbach
INVENTORS
by Sigmund Herzog.
their ATTORNEY

UNITED STATES PATENT OFFICE.

CHARLES W. KRONENBERG AND HERMANN STRANZENBACH, OF NEW YORK, N. Y.

INSECT-CATCHER.

No. 884,095.  Specification of Letters Patent.  Patented April 7, 1908.

Application filed June 21, 1906. Serial No. 322,717.

*To all whom it may concern:*

Be it known that we, CHARLES W. KRONENBERG and HERMANN STRANZENBACH, subjects of the German Emperor, and residents of the city of New York, in the county of New York and State of New York, have invented certain new and useful Improvements in Insect-Catchers, of which the following is a specification.

The present invention relates to insect exterminators or insect catchers and more particularly to that class of the same in which there is employed an adhesive or sticky material such as a slow drying varnish or similar substances for catching the insects.

Devices of this general character consist mostly of plain surfaces such as sheets or tapes, placed either horizontally or hung up vertically.

The present invention consists of a collapsible hollow body of any desired shape or configuration, such as a prism, pyramid or a cone, being provided on its outside with the said adhesive material. A plurality of the devices are usually packed collapsed along lines passing through the vertex of the pyramid or cone one on top of the other, or in a container, with their sticky surfaces placed together, each device is provided with means for causing it to take its operative shape when removed from its container or pack.

The device is illustrated in two of its forms in the drawings, in which—

Figure 1 is a perspective front view of the device, Fig. 2 is a similar view of a pack or series of the devices, held together by the adhesion of the sticky surfaces, Fig. 3 is a view from below of Fig. 1, and Fig. 4 is a similar view to Fig. 1 of a modified form.

In making the device, a blank of self-supporting material, such as stiff paper or cardboard or other similar material is coated on one side with an adhesive or sticky substance and then suitably folded along lines passing through the vertex of the pyramid or cone so that in packing the devices for storage or transportation, a series of the same may be placed with their sticky surfaces together.

In Fig. 2 of the drawing, a pack of these insect catchers is illustrated, each of which, when opened, takes the shape of a pyramid, as shown in Fig. 1. The two sides 1 and 2 of one device are placed in contact with the remaining two of the four sides of the next blank. The side 1 of the blank is preferably provided with one member of a locking device, such as the tongue 4, which engages a slot 5 of the adjoining side 2.

The base of each side of the pyramid may be provided with an up-turned edge 3 for the purpose of preventing the running off of the sticky substance and the soiling of the locality where the catcher is placed or hung up on its hook or loop 6, made of cord, wire, etc., and located on the vertex of the pyramid.

Two diagonally opposite edges of the collapsible hollow body are connected with an elastic or resilient means, such as a rubber band 7. This band 7 is preferably of a length equal to the diagonal distance of two opposite edges of the device when in its final form of a pyramid, cone or prism.

When packed together, as shown in Fig. 2, the band 7 is stretched beyond its normal length, so that in removing one blank from the rest of the package, the band 7 will return to its normal length and, therefore, cause the device to take its final shape, for instance that shown in Fig. 1.

The blanks may be removed from the package by simply lifting the same by means of the eye 6, so that the device will obtain its form without using, and thereby soiling, the hand.

Fig. 4 illustrates a modification of the invention in the shape of a four-sided prism and the locking device consists of an overlapping portion 8, held to the abutting side by staples 9.

As new and useful is claimed and desired to be secured by Letters Patent of the United States:—

A pack formed of collapsed pyramidic bodies, each of which is formed of a single blank comprising a number of triangular sides and a corresponding number of trapeziform extensions on the base of said sides and adapted to be turned upward so as to form a rim, one of said sides having a number of slots and another of said sides a number of tongues adapted to engage said slots and form thereby a pyramidic body collapsible along lines passing through the vertex of the pyramid, each body having an outer coating of adhesive material and adapted to adhere to the adjoining body, the rim on the base of each side of the pyramid not adhering, a loop on the vertex, and an elastic means secured to two opposite points of the base of the pyramids and adapted to open the same on removing it from its adjoining collapsed pyramid.

Signed at New York in the county of New York and State of New York this twelfth day of June A. D. 1906.

CHARLES W. KRONENBERG.
HERMANN STRANZENBACH.

Witnesses:
R. J. SACHERS,
VICTOR KERTISZ.